United States Patent [19]
Alford

[11] Patent Number: 5,722,070
[45] Date of Patent: Feb. 24, 1998

[54] CELL OF PREFERENCE CHECK IN A COMMUNICATIONS NETWORK

[75] Inventor: George Christian Alford, Plano, Tex.

[73] Assignee: Uniden America Corporation, Ft. Worth, Tex.

[21] Appl. No.: 421,057

[22] Filed: Apr. 12, 1995

[51] Int. Cl.[6] .................................................. H04Q 07/32
[52] U.S. Cl. .......................... 455/425; 455/434; 455/437; 455/515; 455/525
[58] Field of Search ...................... 455/33.1, 33.2, 455/33.3, 33.4, 53.1, 54.1, 54.2, 56.1, 422, 425, 434, 435, 436, 437, 515, 517, 525; 379/59, 60, 63

[56] References Cited

U.S. PATENT DOCUMENTS

| | | | |
|---|---|---|---|
| 4,775,999 | 10/1988 | Williams | 379/59 |
| 4,903,320 | 2/1990 | Hanawa | 455/34 |
| 5,212,822 | 5/1993 | Fukumine et al. | 455/33.1 |
| 5,212,832 | 5/1993 | Ness-Cohn | 455/54.1 |
| 5,214,789 | 5/1993 | George | 455/56.1 |
| 5,222,248 | 6/1993 | McDonald et al. | 455/54.2 X |
| 5,276,905 | 1/1994 | Hurst et al. | 455/33.1 |
| 5,361,396 | 11/1994 | Onoe et al. | 455/33.4 |
| 5,379,451 | 1/1995 | Nakagoshi et al. | 455/54.2 |

*Primary Examiner*—Reinhard J. Eisenzopf
*Assistant Examiner*—Philip J. Sobutka
*Attorney, Agent, or Firm*—Daniel R. Brown

[57] ABSTRACT

An apparatus and a method for checking the cell of preference in a multi-cell communications system is disclosed. While a communications receiver or transceiver is currently receiving an acceptable signal from a current cell, a cell of preference is checked for a brief period of time for a cell beacon. If a cell beacon is received, the receiver or transceiver continues to receive the cell of preference. If not, the receiver or transceiver returns to the current host cell. The preferred embodiment is directed to a land mobile radio system which broadcasts cell ID codes at periodic intervals. In the preferred embodiment, the transceiver checks-in to the cell of preference to announce its presence such that future communications can be directed to the radio after check-in.

27 Claims, 7 Drawing Sheets

CELL OF PREFERENCE CHECK IN A COMMUNICATIONS NETWORK

TECHNICAL FIELD OF THE INVENTION

This invention pertains to multi-cell communications systems. In one embodiment, a multi-cell mobile radio communications system is described.

BACKGROUND OF THE INVENTION

Modern communications systems have evolved to provide service over wide geographic areas. It is common that a geographic area is divided into cells of service area. Such division is often accomplished by installing a fraction of the system infrastructure within each cell for providing communications service within each cell. The various fractions of infrastructure may or may not be interconnected with communications resources to form an integrated communications network.

Radio communications systems are particularly well suited for division into cells. In such a system, the geographical cell is defined and limited by the radio service coverage that radio communication system infrastructure placed within the cell can provide. Indeed, the United States advanced mobile telephone service standard is commonly known as "cellular" telephone service by virtue of the cell structure of the infrastructure which provides the communications service to users. However, other radio communication systems also employ such cell architectures. Among these are multi-site radio paging systems, personal communications networks, advanced cordless telephone systems, land mobile radio systems, and others.

A communications receiver or transceiver which operates in a multi-site cell system normally communicates with the infrastructure equipment in one cell at a time. Once a cell is identified that provides acceptable service, the communications receiver or transceiver tends to stay in communications with that cell until an event occurs that causes it to change its cell of operation. In a radio based communications network, this change is accomplished by changing the frequency of operation of the receiver or transceiver.

The loss of an acceptable signal from a current cell of operation is a common event which causes a receiver or transceiver to communicate with an alternative cell. In such an example, the receiver or transceiver scans other frequencies of known cells to search for an acceptable signal. When one is found, the receiver or transceiver monitors the new found signal to communicate with the cell. Also, in systems which employ transceivers, the system infrastructure may direct a transceiver, by transmitting a message to the receiver, to change its cell of operation based on various factors. For example, system channel loading or signal level degradation are stimuli that are interpreted by the system infrastructure and cause it to direct a transceiver to change its cell of operation.

In prior art radio communications systems, such as multi-cell systems in the land mobile radio environment, a radio that moves away from a current cell of operation will experience a gradual reduction of signal quality, and at some point will be unable to communicate due to a total loss of signal. Typically, the radio will scan a list of frequencies or channels, which correspond to other cells, and upon detecting an acceptable signal, communicate with the new found, alternative cell. The process generally known as roaming. In another example, a radio does not wait until the signal from the current cell is completely lost, but rather begins scanning at a certain signal level threshold. In either case, once an acceptable alternative signal is found, the receiver or transceiver continues to monitor and communicate with the new found cell until its signal falls below a certain threshold. In effect, the alternative cell becomes the current cell of operation, also known as a host cell.

There are various kinds of communication services that occur in multi-cell communications systems. Examples are telephone interconnection to the public switched telephone network, radio to radio calls within a single cell, (DISPATCH), radio to radio calls across cell boundaries, (RADIO PRIVATE CALLS), transmission of data messages, and video communications. Some of these communication services can be accomplished in an multi-cell communications system where there are no communications links between cells, others require specialized communications resources linking cells in order for communications paths to be established. It is common that a single radio will access more than one kind of communications service.

It is typical that the way in which a call is processed by a communications system will affect the speed and efficiency in which it is processed and the cost associated with placing and receiving the call. For example, it is usually faster and more efficient to process a call within a single cell's infrastructure, than it is to involve resources which link other cells and other cell infrastructures, or external communications network. It is less costly to places a telephone interconnected call within a cell that is interconnected in the toll free calling area of a particular telephone call destination than it is to place it from a cell which is located at a place where long distance telephone charges would apply.

In another aspect, dispatched calls that are placed through a single cell in a land mobile radio system are fast and efficient to place and receive. Typically, a push-to-talk button is pressed on a transceiver and the communications channel is allocated in a fraction of a second. The end user merely presses a button and talks. The recipients of a dispatch call merely hears the speaker's voice come form their radio, and reply to the call by merely pressing their push-to-talk buttons in similar fashion. If such a call is placed across two or more cells, there is a requirement to establish a cell to cell communications link prior to allowing a user to speak. This takes time, and adds cost, and is generally less favorable than dispatch communications within a single cell.

Due to the way in which a receiver or transceiver selects its current cell of operation, as described earlier, the prior art does not optimize the selection of a cell of operation in a way that is most efficient, convenient, or cost effective. If a receiver or transceiver usually operates in a first cell, and most of the communications services it utilizes are most efficient, convenient, or cost effective in the first cell, then the receiver or transceiver is no longer operating a optimum efficiency or cost effectiveness when it roams to an alternative cell of operation. However, in practical multi-cell radio systems, such roaming is common due to the real world variances of radio communications.

See FIG. 1, for example, which depicts a two cell communications system 100. A first cell 'A' provides communications service within cell 102, and a second cell 'B' provides communications service within cell 104. However, a sub-area of cell 'A' 106 is not served by the infrastructure equipment of cell 'A' (not shown). Such lack of coverage commonly occurs when an area is blocked from radio coverage by an obstacle such as a building.

If a radio moves from a first position 108 into a second position 110 which falls within the non-covered area 106, then the cell 'A' signal will be lost., This will cause the radio to roam which will ultimately cause the radio to receive a signal from cell 'B' 104. When the radio moves to position 112, then the radio will be within the radio coverage of cell 'A'. However, since the radio will still be receiving a signal from cell 'B', it will not roam to cell 'A'. Therefore, subsequent communications will not be made in the most efficient, convenient, or cost effective manner.

It should be remembered, however, that it is better to receive less efficient or more costly communications than none at all, which would be the case if the receiver or transceiver in the foregoing example were to actually move out of radio range of the original cell of operation. In that case, it is certainly desirable to roam to and communicate with an alternative cell of operation.

It can been understood from the foregoing that there is a need to select a cell of preference in a multi-cell communications system such that radio communications can occur in an efficient, convenient, and cost effective manner.

SUMMARY OF THE INVENTION

An apparatus for communicating within a multi-cell communications system that automatically checks a cell of preference is disclosed. The cell of preference being the cell in which the apparatus is programmed to prefer to originate or receive a particular call from. The apparatus may be either a communications receiver or communications transceiver, hereinafter generically referred to as a radio. While monitoring a signal from a current cell of operation, (host cell), and upon receiving and decoding a signal identified as a signal from the cell of preference, the radio continues to monitor the cell of preference, even though a host cell of operation is providing an acceptable communications signal.

The signal received from the cell of preference may comprise a cell beacon which is modulated onto a radio frequency carrier. Further, the cell beacon may comprise a cell ID code which identifies the cell from which it is transmitted. The cell of preference is retained in a memory as an indicia of cell of preference, or as a cell ID code. The memory may comprise a plurality of storage locations for storing a plurality of indicia of cell of preferences or cell ID codes.

The process of checking of a particular cell of preference is accomplished by a controller which is coupled to the memory and which recalls an indicia of cell of preference or a cell ID code and enables a radio to adjust its operating frequency to receive a signal for a first period of time. If a cell beacon or cell ID code is received within the first period of time and it corresponds to the indicia of cell of preference or cell ID code recalled from the memory, then the controller enables the radio to continue to receive the cell of preference.

The selection of a particular cell of preference may be preprogrammed into the radio, and as such, be transparent to the end user, or the radio may comprise and actuator for selecting one of a plurality of the indicia of cells of preference or cell ID codes stored in the memory so that the end user can actuate the actuator to select a particular cell of preference. Additionally, the cell of preference may be linked to a call destination, wherein the user actuates a second actuator to select a call destination and the controller recalls a particular indicia of cell of preference or cell ID code according to the call destination selected. This mode of operation is advantageous because the cell of preference may be different depending on the call destination. For example, the cell of preference for a telephone interconnected call would be the cell that is in the local toll free calling area for the telephone number.

A method of receiving a signal from a cell of preference is also disclosed. In a communications system wherein at least a first cell transmits a first signal having a cell beacon modulated thereon, and which may comprise a cell ID code that identifies the cell which transmitted it, a controller in a radio enables a receiver or transceiver to receive a first signal for a first period of time, while the receiver or transceiver is enabled to receive a second signal, and, if a cell beacon or cell ID code is decoded by the controller, the controller enables the radio to continue to receive the first signal beyond the first period of time.

In a similar fashion as the apparatus, one or a plurality of indicia of cell of preferences or cell ID codes are stored in a memory and are recalled by the controller in order for the controller to enable the radio to receive the signal corresponding to the cell of preference. The indicia of cell of preference or cell ID code may be preprogrammed into the radio, user selectable by actuation of an actuator, or may be associated with a call destination. If the latter is the case, there may be a plurality of call destination each having an associated, corresponding indicia of cell of preference or cell ID code. As such, when the user selects a call destination, the controller periodically checks the cell of preference by enabling the receiver to receive a first signal corresponding to the cell of preference and if a corresponding cell beacon or cell ID code is decoded, then the cell of preference has been found.

In either of the apparatus or method, the controller may enable a transmitter in the radio to transmit a check-in message to inform the cell of the preference of the radio's presence in the cell. For this arrangement, the radio remains checked-in to the current host cell, otherwise known as host cell, until a cell of preference signal is received and decoded. Then, the communications apparatus checks-in to the cell of preference, which then becomes the current host cell. One benefit of this arrangement is that the receiver remains enabled to communicate with the previous host cell until the cell of preference check is successfully completed. In the prior art, when the signal form a current host cell has gone below the aforementioned threshold, then the communications apparatus begins scanning for an alternative cell. During this searching period, the communications apparatus is unable to place or receive calls.

In the preferred embodiment, a cell transmitter transmits a cell beacon periodically, that is interspersed with other communications. By defining the duration of the cell beacon and the frequency with which it is transmitted, the radios operating in conjunction with the cell can enable their receivers to receive the signal carrying the cell beacon for a relatively short fixed period of time and be certain that a cell beacon will be transmitted during that period of time. This aspect of the invention allows a radio to spend the majority of its time enabled to receive the host cell signals, which makes the radio accessible for communications, and use only a small portion of its time enabled to receive a signal from the cell of preference.

Another aspect of the present invention is the ability to store a plurality of indicia of cell of preferences or cell ID codes in the memory which allows the radio flexibility of operation depending on its geographic location or call destination, or other factors.

Generally, this invention relates to a broad range of types of communications systems. Both receive only and transceiver radios can benefit from the invention. The communications system, likewise can be varied. In a basic system, there are a plurality of cells which each have a single radio transmitter that transmits communications messages or calls. Or, one or more of the cells in the system may comprise a plurality of transmitters operating on different frequencies or channels. In a multi-channel per cell system, the radio is enabled to receive one or more of the channels at each cell. An underlying protocol may be used in the cell for channel management. One or more of the channels in each cell may transmit periodic cell beacons.

Another communications system which can benefit from the present invention is one which employs radio transceivers. Again, single or plural transceivers per cell can be employed. Cell beacons may be transmitted from one or more of the channels in each cell.

In a multi cell environment, plural cells may transmit cell beacons. Since one aspect of the present invention is that radios monitor their host cell for signal quality, this can be accomplished using the cell beacon transmission. The radio counts the number of cell beacons received over a preprogrammed time period and compares the count to a minimum cell beacon count threshold. The count is generally a large number so the time to receive the message is relatively long. If the cell beacon count is below the cell beacon count threshold, then the radio roams by repeatedly enabling the radio's receiver to receive signals from a list of channels in its memory. As soon as a signal is received, the radio checks-in to the cell transiting the signals.

Alternatively, if the cell beacon count is greater than the cell beacon count threshold, then the radio is receiving an adequate signal and performs a cell of preference check by enabling its receiver to receive the aforementioned first signal from the cell of preference. This technique causes the radio to periodically check the cell of preference, but only while a satisfactory signal is being received from the current host cell. If a satisfactory signal is not being received, then the radio seeks the first available cell with which to communicate in order to maintain communications with the greatest possible continuity. Once a satisfactory host cell is found, then the cell of preference check resumes. Another aspect of the invention is that the radio does not execute cell of preference checks while it is engaged in a call or hosted by its cell of preference.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

The preferred embodiment of the present invention directed to cell of preference checking in a multi-cell communications system is in the form of a land mobile radio system having at least two radio base station sites, each of which defining a cell of coverage. In such a system, radios, which may be mobile radios, hand-portable radios or fixed control stations, may have access to one or more radio base stations. The radio base stations are in the form of radio repeaters which receive signals from the radios and retransmits the signals to other radios. Alternatively, the base stations may interconnect the signals received from the radios to the public switched telephone network or other private or public communications network. The operation of the repeaters is under control of a base controller.

Figure 1:
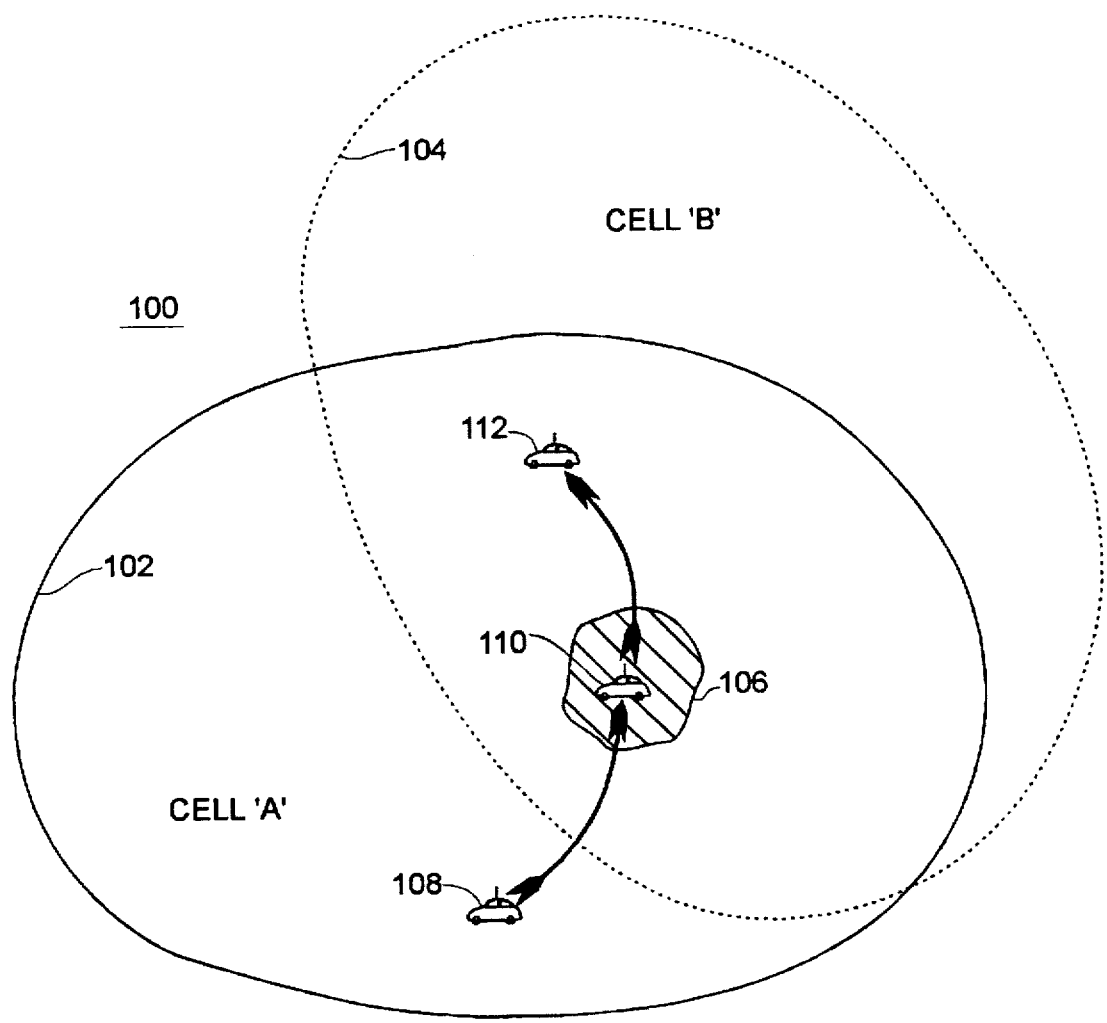
FIG. 1 is a network diagram depicting a mobile radio roaming within a two cell network.
Figure 2:
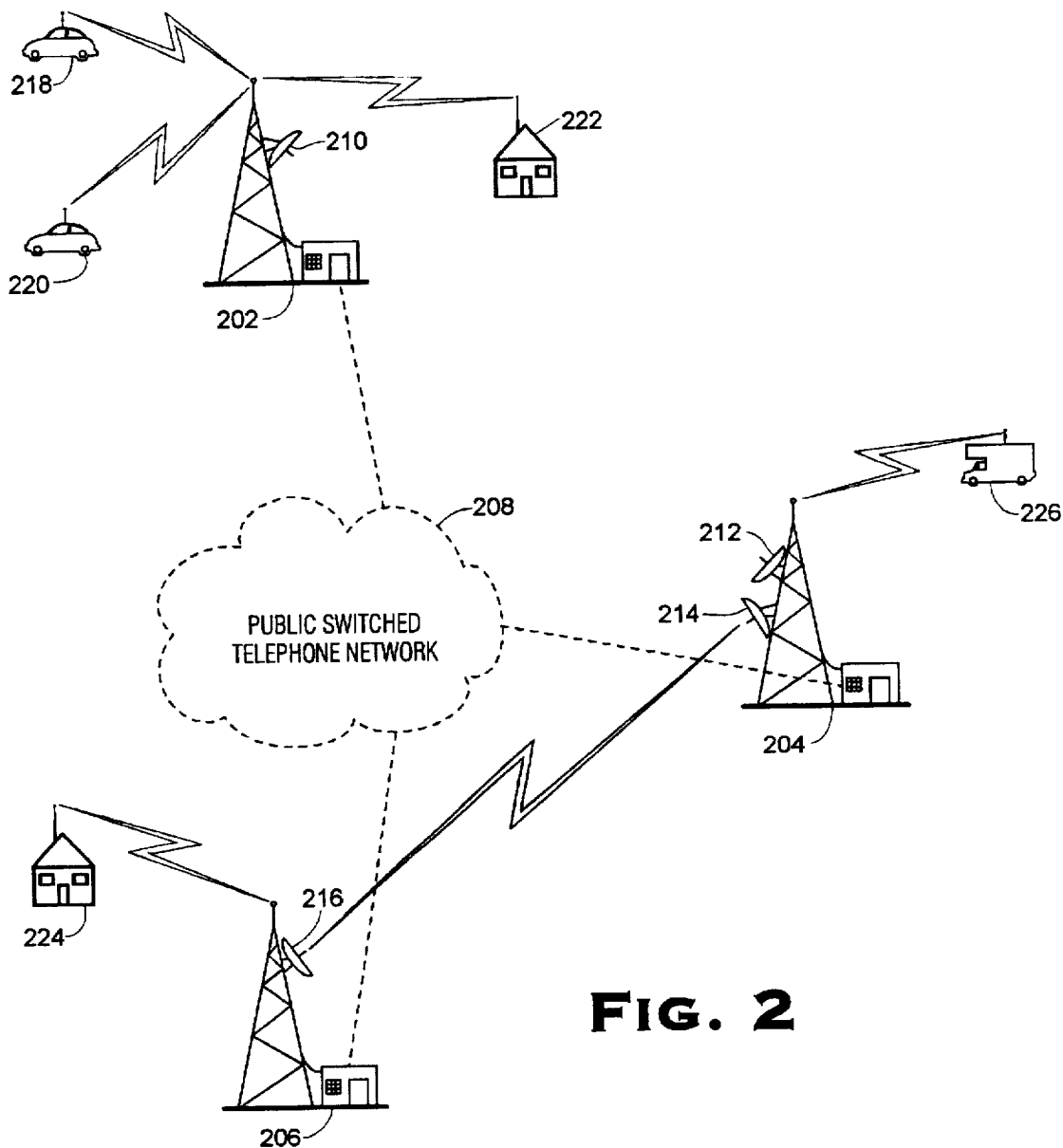
FIG. 2 is a three cell network diagram depicting communication paths.

FIG. 2 is a diagram of a three site network as in the preferred embodiment. In this example, the network is interconnected to the public switched telephone network 208 which has communications circuits connected to base station repeater sites 202, 204, and 206. These sites are alternatively known as cell sites. The cell sites 202, 204, and 206 are also linked with microwave communications links 210, 212, 214, and 216. Control stations 222 and 224 establish radio communications with cell sites 202 and 204, and mobile radios 218, 220, and 226 roam within the radio coverage areas of the cells.

A variety of call types are place in such a network. For example, at cell site 202, control station 222 and mobile radios 218 and 220 can converse in dispatch mode. In this mode, each user can key the transmitter of a radio and the radio will transmit a signal to access the cell site which is currently the host cell for the particular radio. The cell site equipment will receive and re-transmit the signal and the re-transmitted signal will be received by the other radios who are also within the coverage of the cell site 202. Provided, however, that the other radios have been preprogrammed to communicate with the radio that initiated the dispatch call. When the user dekeys the radio transmitter, the call ceases and the radio signals are terminated. To respond to a call, the other radios may key their transmitters in a like fashion to respond to the call.

In another type of call, control station 224 and mobile radio 226 communicate via radio signals to cell sites 206 and 204 respectively. Microwave equipment 216 and 214 link the cell sites together and allow the control station 224 and mobile radio 226 to communicate.

In another mode of communications, any of the mobile radios may communicate with its current host cell to access the public switched telephone network. Each of cell sites 202, 204, and 206 have access to local telephone lines and as such can place toll free calls within the local telephone calling area. Of course, long distance charges would apply if a call were originated at a cell site to a long distance destination, even if another cell in the network had local access telephone lines connected to it.

Figure 3:
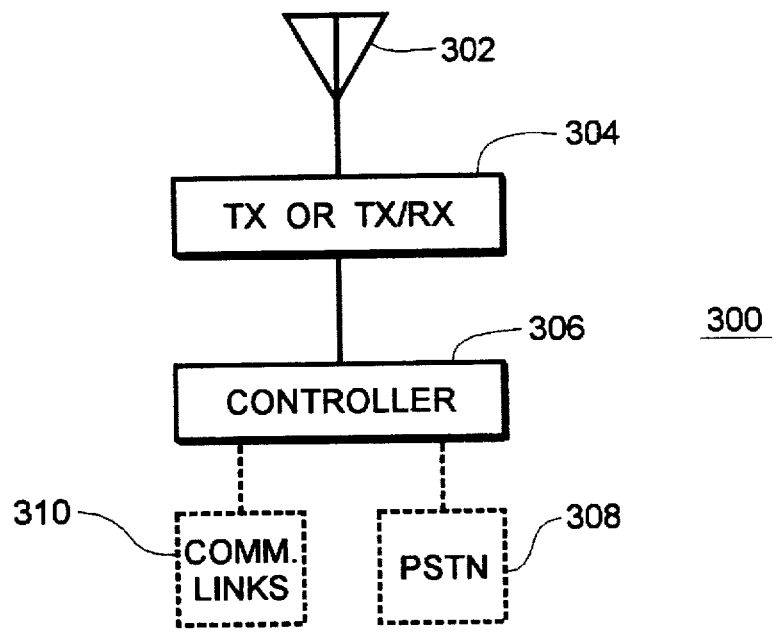
FIG. 3 is a functional block diagram of a single channel base station.

Each cell site comprises base station equipment. The base station equipment may comprise one or more radio channels. In FIG. 3, an antenna 302 is coupled to a transmitter or transceiver 304. In a one-way communications system, such as a paging system, only a transmitter is required. However, in a two-way communications system, such as the preferred embodiment, a transceiver having a transmitter and receiver is required. The transceiver 304 comprises radio equipment as well as antenna coupling equipment. The transceiver 304 operates under the control of a base controller 306, which may be a personal computer based system, for example. Alternatively, there are several commercially available base controllers. One aspect of the base controller is that it is programmable to transmit a cell beacon, which is a digital message modulated onto the radio signal transmitted by the transmitter, in the preferred embodiment.

Base controller 306 is operable to switch audio and other signals between communications resources. In FIG. 3, base controller 306 is optionally coupled to the public switched telephone network 308 and other communications links 310, which may be a microwave link to another cell site, for example. In operation, a mobile radio accessing a cell site sends a call request which specifies the call type, and base controller 306 interprets the call request and switches signals to resources as necessary.

Figure 4:
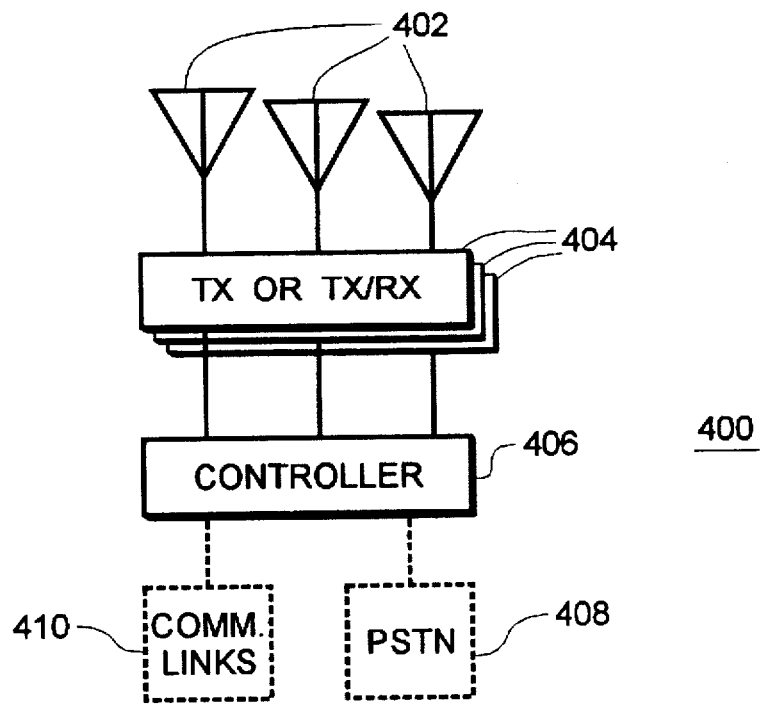
FIG. 4 is a functional block diagram of a plural channel base station.

The foregoing base station described a cell site having a single radio channel. It is common that a plurality of radio channels are trunked together to form a trunked group, as in FIG. 4. A cell site comprises base station equipment 400. One or more antennas 402 are coupled to transmitters or transceivers 404. In the preferred embodiment, transceivers are employed in a two-way radio trunked system. The transceivers 404 further comprise antenna coupling circuits such as receiver multi-couplers and transmit combiners. A base controller 406 is coupled to the transceivers 404 and controls their operation. Base controller 406 comprises audio and data signal switching circuits which allows the base controller 406 to interconnect the various communications resources. For example, a first repeater could be coupled to either a second repeater, a telephone line in the public switched telephone network via the PSTN interface 408, or to another communications links via 410. The other communications link 410, could be a microwave link to another site, for example.

The base controller 406 is operable to transmit a cell beacon signal on at least one of the plurality of transceivers 404. In the preferred embodiment, a cell beacon that identifies a particular cell is transmitted on every transceiver in the cell site base station. However, in systems which employ a dedicated control channel, it is preferred to transmit the cell beacon on the dedicated control channel because all radios operating from a particular host cell cite would receive signals from that dedicated control channel.

Figure 5:
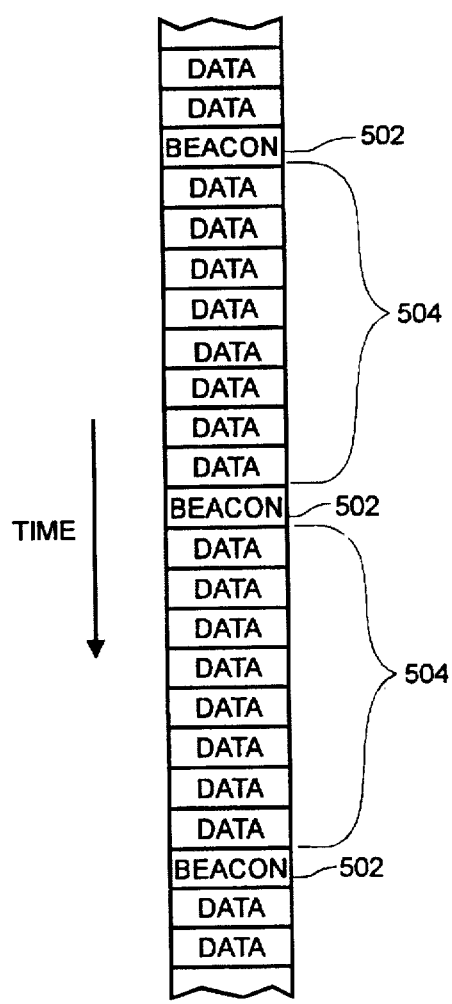
FIG. 5 is a data diagram showing the sequential flow of data.

FIG. 5 is a data diagram of the cell beacon transmission scheme used in the preferred embodiment. A cell beacon 502 is repeatedly transmitted from a transmitter in a cell site. The cell beacon 502 is interspersed within regularly transmitted data packets 504. The data packets 504 are used for other aspects of the trunking system such as call set-up and channel management. It is important to transmit the cell beacon periodically and that it is transmitted at a predictable time interval no greater than a predetermined period of time. In the preferred embodiment, the time interval is 1.25 second from cell beacon to cell beacon. The duration of the cell beacon 502 and the data packets is approximately 134 milliseconds. The timing aspect is important because the radios will enable their receivers to receive this signal and they will remain enabled long enough to insure that at least one entire cell beacon will be received. That time interval being equal to or greater than the period from cell beacon to cell beacon plus the duration of one cell beacon. Another aspect of the timing relationship is that radios which are checked into a host cell accumulate a count of cell beacons over a period of time. A preprogrammed cell beacon count threshold is compared against the cell beacon count to determine the quality of the received signal. A count that falls below the threshold would indicate that a poor signal is being received and cause the radio to roam.

Figure 6:
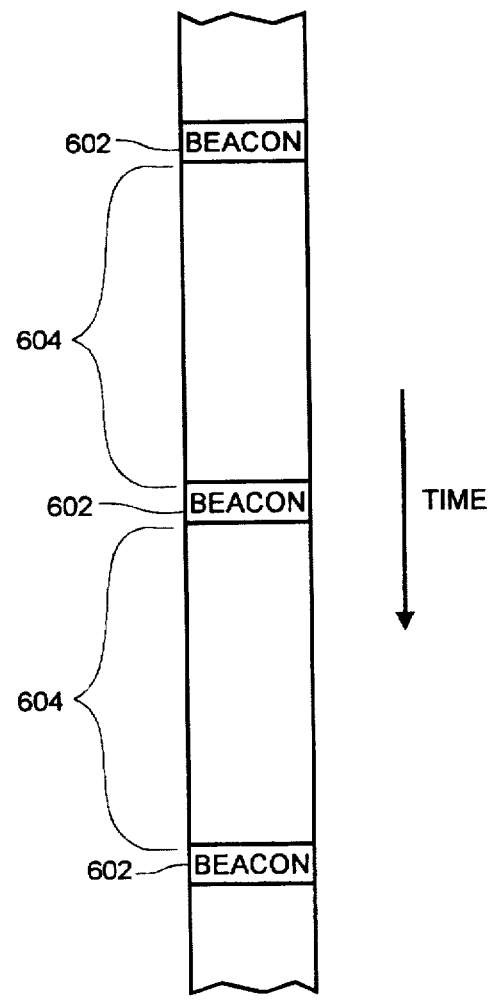
FIG. 6 is a data diagram showing the sequential flow of data, with idle time.

Referring to FIG. 6, which is a data diagram for a system that does not transmit data messages or a system that is idle of any ongoing communications traffic, the cell beacons 602 are transmitted periodically during idle intervals 604. Again, the period from cell beacon to cell beacon is 1.25 seconds and the duration of a cell beacon is approximately 134 milliseconds in the preferred embodiment. However, other time periods could be employed depending on system requirements.

In the preferred embodiment, the cell beacon comprises a cell ID code among other data. This is because the cell beacon is structured in a similar form to other data packets which are transmitted by the trunked radio system. In the preferred embodiment, the cell beacon comprises a synchronization portion, a repeater identification portion, a cell ID code portion which is 7-bits long and therefore defines one of one hundred and twenty eight cells, an error detection portion, and other channel management portions. However, the present invention can be practiced in a system where the cell beacon comprises only a cell ID code, and where no other applications of data communications are employed. In fact, the present invention could be practiced without the use of data by employing tone sequences or other information communications schemes.

Figure 7:
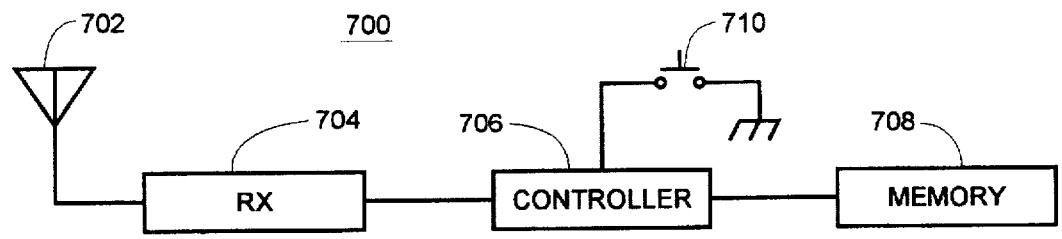
FIG. 7 is a functional block diagram of a radio receiver.

FIG. 7 is a functional block diagram of a communications receiver 700 used in the present invention. This receiver design is appropriate in a receive only system employing the present invention. An antenna 702 is coupled to a radio frequency receiver 704 which operates under control of controller 706. A memory 708 is coupled to controller 706 for storing at least a first indicia of cell of preference or cell ID code. An actuator 710, for accepting user inputs is also coupled to controller 706.

In operation, the communications receiver 700 monitors a first radio signal, called the current or host radio signal. This is accomplished by the controller 706 enabling the receiver 704 to receive a certain frequency or channel. While the controller is able to determine that an acceptable signal is being received on the host channel, it recalls an indicia of cell of preference or cell ID code from the memory 708 and enables the receiver to receive a signal corresponding to the indicia of cell of preference for a first period of time. If a cell beacon is received, and the controller 706 decodes the cell beacon and determines that it corresponds to the recalled indicia of cell of preference, then the controller enables the receiver 704 to continue to receive the cell of preference beyond the first period of time. On the other hand, if the receiver 704 does not receive, and the controller 706 does not decode a cell beacon corresponding to the cell of preference during the first period of time, then the controller enables the receiver 704 to continue to receive the host signal. The foregoing procedure is called a cell of preference check because the controller 706 checks for a signal from a cell of preference and if it is found, enables the receiver 704 to receive the preferred cell's signal.

It should be noted that the controller 706 performs the foregoing cell of preference check while the communications receiver is able to receive an acceptable signal from its host cell. If an acceptable signal is not being received, then the controller would cause the radio to roam by sequentially checking all of the valid operating frequencies programmed into its memory. The function of the cell of preference check is to cause the communications receiver to prefer a previously specified cell of preference as described above.

The actuator 710 is optional and is actuated by a user to change the cell of preference. Actuation of the actuator 710 causes the controller to recall of different indicia of cell of preference at the beginning of a cell of preference check.

The indicia of cell of preference is equal to the cell ID code transmitted in the cell beacon in the preferred embodiment. Therefore, a seven bit data field is stored in the memory 708 and it is recalled by the controller 708 and compared with a seven bit field decoded from the cell beacon. If the two seven bit data fields are found to be equivalent, then the signal received has been determined to come from the cell of preference.

Figure 8:
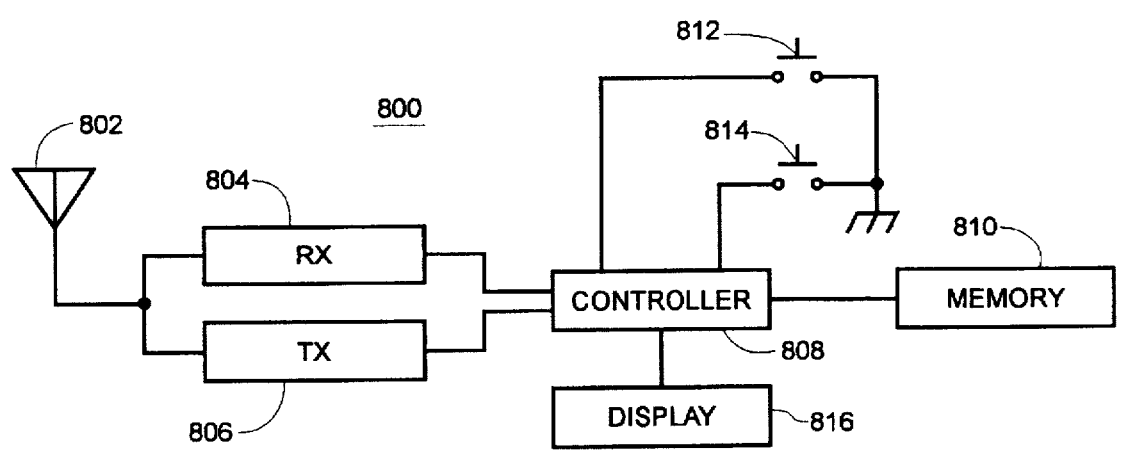
FIG. 8 is a functional block diagram of a radio transceiver.

FIG. 8 is a functional block diagram of a radio 800 in the preferred embodiment of the present invention. An antenna 802 is coupled to both a radio receiver 804 and a radio transmitter 806. The radio receiver 804 and radio transmitter are in-turn coupled to controller 808. A memory 810 is coupled to controller 808. The memory has a plurality of storage locations for storing at least a first indicia of cell of preference or cell ID code. A first actuator 812 and a second actuator 814 are coupled to controller 808 to allow user input of commands which will be discussed hereinafter. Finally, a display is coupled to controller 816 for displaying information about the operation of the communications transceiver 800.

In the preferred embodiment, the radio checks-in to a host cell be transmitting a check-in data message to the cell site and announcing the communications transceiver's presence in the cell. This information is used by the cell site, or the network of cell sites to coordinate call traffic to and from the particular radio.

In addition to the functional blocks shown in FIG. 8, the radio 800 also comprises audio circuitry including a microphone and loud speaker (not shown) enabling verbal communications between users.

In operation, the user selects a call destination by actuating a second actuator 814 to incrementally step between the plurality of call destination. The call destinations are displayed as numerical digits on the display 816. For example, call designation '1' could be the local dispatch channel on site 'A'. Call destination '2' could be a telephone call to a specific telephone number that is in the toll-free calling area of cell 'B'. Call destination '3' could be a radio private call to a control station located in cell 'A', and etc. The user selects the call destination an initiates a call to the destination. Normally, this is accomplished by pressing a push to talk button (not shown) co-located with the microphone.

The call destinations are stored in memory 810 and are associated with an indicia of cell of preference. In this way, by selecting a call destination, the user is also selecting a cell of preference. In an alternative embodiment, the user selects the call destination by actuating a first actuator 812 in the communications transceiver. This technique allows the user to make a conscious decision about the preferred cell of operation. By repeatedly actuating actuator 812, the user scrolls through a plurality of memory locations having indicia of cells of preference stored therein. A cell identifier is displayed on display 816 to indicate to the user which cell of preference is currently selected.

In either case, once a cell of preference is selected, the function of the cell of preference check is similar to that described with respect to FIG. 7. However, in the embodiment described with respect to FIG. 8, the communications transceiver transmits a check-in message to the cell of preference upon receiving a cell beacon that corresponds to the indicia of cell of preference recalled from the memory 810.

Figure 9:
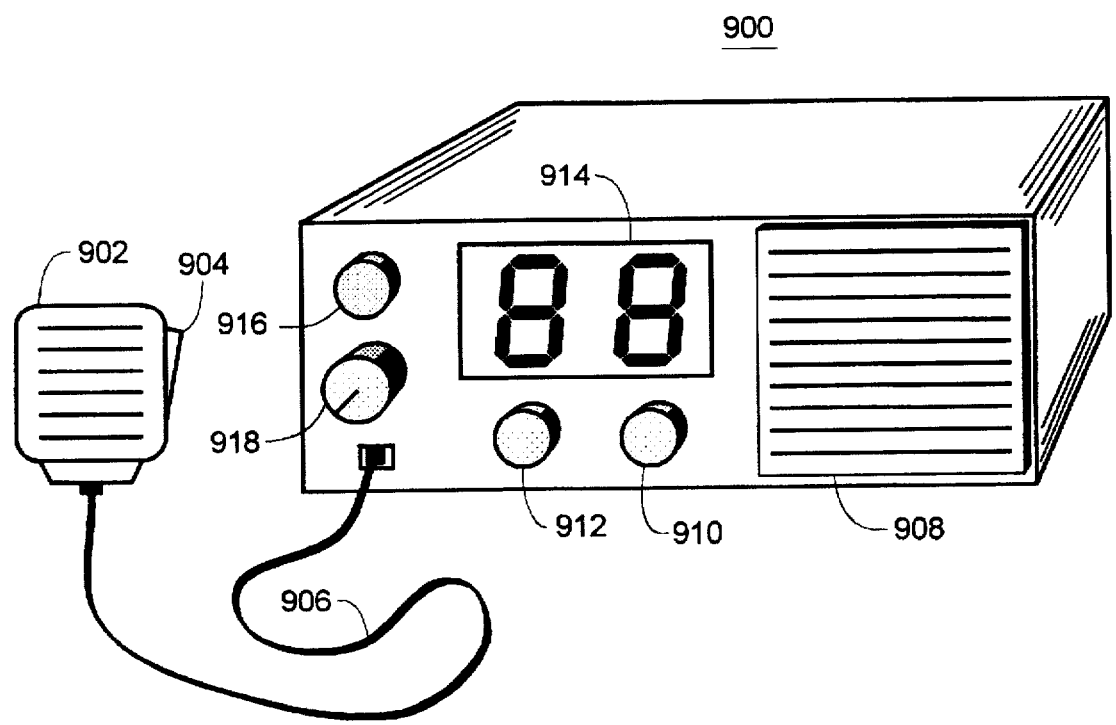
FIG. 9 is a view of a radio.

FIG. 9 is a view of a radio transceiver 900 in the preferred embodiment of the present invention. A microphone 902 having a push to talk button 904 is coupled to the transceiver via a cable 906. A user presses the push to talk button to initiate a call and speaks into the microphone to transmit voice messages. A power switch 916 is provided to turn the radio on and off. A volume control knob 918 adjusts the volume of received audio signals which are reproduced through loud speaker 908. A first actuator 910 and a second actuator 912 are provided for user actuation and selection of call destination and cell of preference. Each actuator has a corresponding digit on display 914 which indicate which of the plurality of cells of preference or call destinations is presently selected. In the preferred embodiment, the call destination and cell of preference are represented on the display as numeric digits in the range from zero to nine. However, alphanumeric digits, plurality of alphanumeric digits displaying words and so forth, or lights could be used to indicate the same information. The radio transceiver 900 is a mobile radio, however similar components and functions can be incorporated into a hand portable or control station radio as well.

Figure 10:
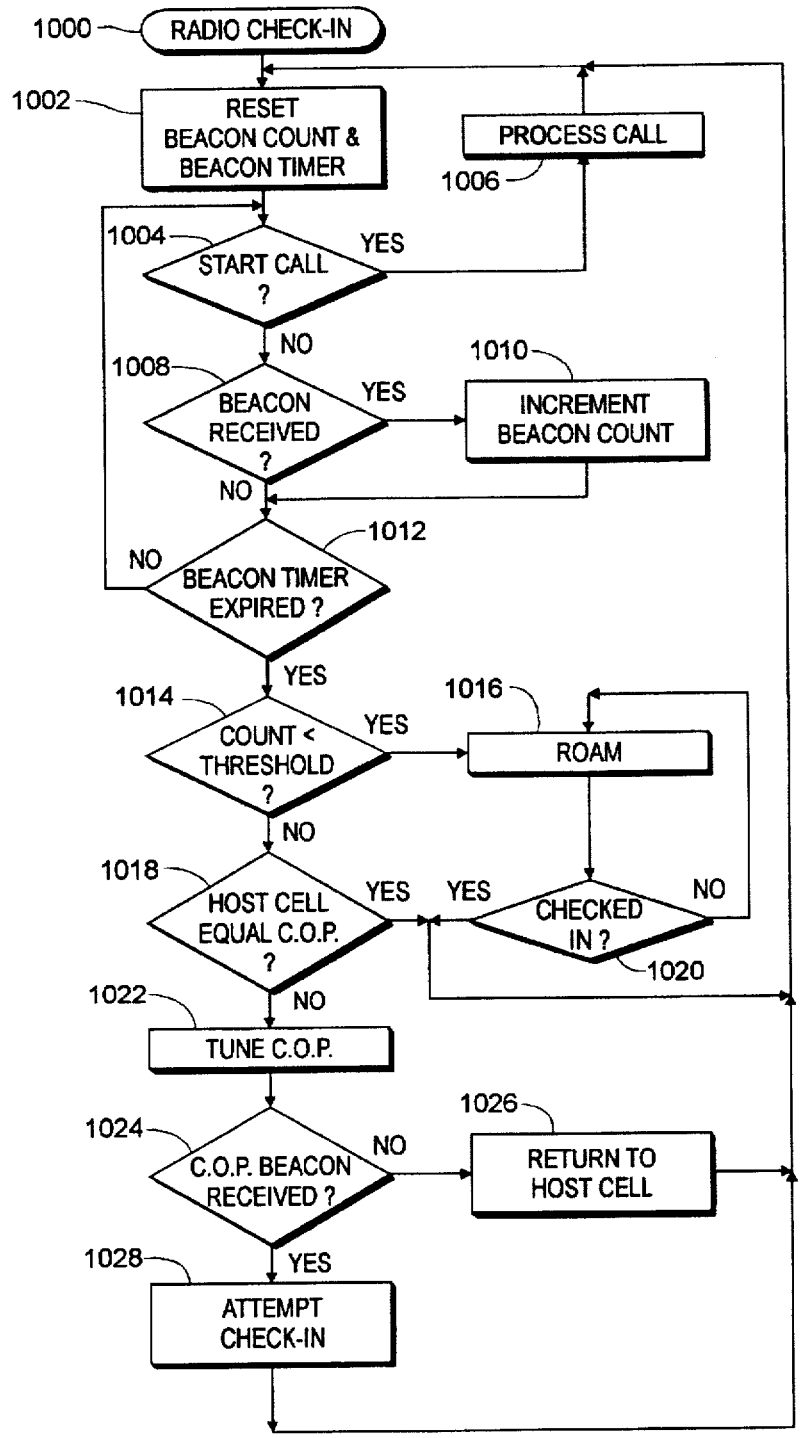
FIG. 10 is a flow diagram of a method of checking a cell of preference.

FIG. 10 is a flow diagram of the cell of preference check and other functions in a radio in the preferred embodiment. As was discussed above, radios in the preferred embodiment check-in to a cell and thereby make it the current or host cell. It is while a host cell is providing an acceptable signal that the radio performs a cell of preference check. Therefore, the flow chart in FIG. 10 begins when a radio checks-in to a host cell at 1000. The controller resets a cell beacon count to zero and sets a cell beacon count down timer to sixty seconds at step 1002. In the preferred embodiment, the cell beacon count down time and threshold are programmable, however, the count down timer is preprogrammed to sixty seconds which provides enough time for 48 cell beacons to be transmitted, and if 24 or more cell beacons are received by the radio, the signal is deemed acceptable. The cell beacon count threshold is therefore equal to 24 cell beacons. However, other times periods and cell beacon count parameters could be used depending on system design performance and architecture.

At step 1004, the controller checks to see if a call has been started. If yes, the call is processed at step 1006 and, after the call is complete, the flow recirculates to step 1002 where the counter and timer are again reset. This loop has the effect of disabling the cell of preference check during a call. This is appropriate because the radio gives a higher priority to maintaining a current call than checking a cell of preference.

If a call has not been started at step 1004, the controller checks if a cell beacon has been received at step 1008. If a cell beacon has been received, then the controller increments the cell beacon counter at step 1010. If no cell beacon has been received or if one has been received and incremented at step 1010, then the controller proceeds to step 1012 to test if the cell beacon timer has expired. If not, the controller proceeds to step 1004 and again checks for the start of a call. The foregoing loop from 1004 through 1012 is repeated until the cell beacon timer has expired at step 1012, at which time, the controller checks to see if the cell beacon count is less than the cell beacon count threshold. In the preferred embodiment twenty four cell beacons in sixty seconds.

If the cell beacon count is less than the threshold at step 1014, then the signal from the host cell is deemed unacceptable and the transceiver roams at step 1016. Roaming is a process where the transceiver attempts to locate any available signal and check-in to the cell from which it originates. As the receiver is tuned to receive each signal, and a signal is received, the radio attempts to check-in by sending a check-in message at step 1020. If the check-in is successful, the controller proceeds to step 1002 to execute the entire cell of preference routine. On the other hand, if the radio is not successful at step 1020, the controller proceeds to step 1016 to continue the roaming sequence.

On the other hand, if the cell beacon count is greater than the cell beacon threshold at step 1014, then the controller checks to see if the current host cell ID code is equal to the presently selected indicia of cell of preference at step 1018. If they are, the controller is already in the cell of preference and need not perform a cell of preference check and returns to step 1002 to begin the foregoing steps again. Alternatively, if the current host cell ID does not equal the currently selected indicia of cell of preference at step 1018, then the controller enables the receiver to receive the cell of preference at step 1022 by tuning the receiver to the cell of preference frequency. The transceiver tunes the receiver to the cell of preference frequency for a first period of time which is equal to or greater than the sum of the period between a cell beacon transmissions and one cell beacon.

At step 1024, the controller checks to see if the cell beacon from the cell of preference has been received. If not, then the controller returns to the host cell at step 1026 and then to step 1002 to begin another loop through the foregoing procedure. On the other hand, if a cell beacon is received from the cell of preference at step 1024, then the controller attempts a check-in to the cell of preference at step 1028. Finally, the controller returns to step 1002 to reenter the loop.

It is to be understood that at step 1022, the controller recalls the current indicia of cell of preference and an associated frequency in order to tune the cell of preference. If the user, or the controller change the cell of preference at any time during the operation of the transceiver, then the change of cell of preference will be reflected into the forgoing flow chart at this point, (step 1022).

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A communications receiver comprising:
   a receiver for receiving a first signal that comprises a cell beacon, and for receiving a second signal;
   a controller coupled to said receiver and operable to enable said receiver to receive either of said first or said second signals, said controller further operable to decode said cell beacon;
   a memory coupled to said controller and having an indicia of cell of preference stored therein that corresponds to said cell beacon;
   a counter coupled to said controller for counting cell beacons received on said first signal, and wherein
   said controller is operable, while said receiver is enabled to receive said second signal, to recall said indicia of cell of preference and enable said receiver to receive said first signal for a first period of time, and wherein during said first period of time said counter counts the number of cell beacons received on said first signal, and upon accumulating a cell beacon count threshold by said counter within said first period of time, said controller enabling said receiver to receive said first signal for longer than said first period of time.

2. The communications receiver of claim 1, and wherein said controller is operable to periodically recall said indicia of cell of preference and enable said receiver to receive said first signal for said first period of time.

3. The communications receiver of claim 1, and wherein said controller is operable to decode a cell beacon that is in encoded as digital data.

4. A communications receiver comprising:
   a receiver for receiving a first signal that comprises a cell ID code, and for receiving a second signal;
   a controller coupled to said receiver and operable to enable said receiver to receive either of said first or said second signals, said controller further operable to decode said cell ID code;
   a memory coupled to said controller and having at least a first indicia of cell ID code stored therein that corresponds to said cell ID code;
   a counter coupled to said controller for counting cell ID codes received on said first signal, and wherein
   said controller is operable, while said receiver is enabled to receive said second signal, to recall said first indicia of cell of preference and enable said receiver to receive said first signal for a first period of time, and wherein during said first period of time said counter counts the number of cell ID codes received on said first signal, and upon accumulating a cell ID code count threshold by said counter within said first period of time, said controller enabling said receiver to receive said first signal for longer than said first period of time.

5. The communications receiver of claim 4, and wherein said controller is operable to decode a cell ID code that is in encoded as digital data.

6. The communications receiver of claim 4, and wherein:
   said memory comprises a plurality of storage locations for storing a plurality of indicia of cell ID codes, and wherein
   said controller is operable to select at least one of said plurality of indicia of cell ID codes.

7. The communications receiver of claim 6, further comprising:
   an actuator, coupled to said controller, for selecting one of said plurality of indicia of cell ID codes, and wherein actuation of said actuator cases said controller to select one of said plurality of indicia of cell ID codes.

8. A radio transceiver comprising:
   a frequency agile receiver for receiving a plurality of radio signals, wherein at least one of said plurality of radio signal comprises a cell beacon;
   a controller coupled to said receiver and operable to control the frequency of reception of said receiver and to enable said receiver to receive either of a first radio signal or a second radio signal, said controller further operable to decode said cell beacon;
   a memory coupled to said controller and having a plurality of storage locations for storing a plurality of indicia of cell of preferences;
   a counter coupled to said controller for counting cell beacons received on said first signal, and wherein said controller is operable, while said receiver is enabled to receive said second radio signal, to recall one of said plurality of indicia of cell of preference and enable said receiver to receive said first radio signal for a first period of time, and wherein during said first period of time said counter counts the number of cell beacons received on said first signal, and upon accumulating a cell beacon count threshold by said counter within said first period of time, said controller enabling said receiver to receive said first signal for longer than said first period of time.

9. The radio transceiver of claim 8, further comprising:
a first actuator, coupled to said controller, wherein actuation thereof causes said controller to recall one of said plurality of indicia of cell of preferences from said memory and said controller further enables said receiver to receive said first radio signal corresponding to said recalled one of said plurality of indicia of cells of preference.

10. The radio transceiver of claim 8, further comprising:
a second actuator, coupled to said controller, for selecting a call destination, and wherein
said controller recalls one of said plurality of indicia of cells of preference based on a selected call destination.

11. The radio transceiver of claim 8, and wherein said controller is operable to decode a digitally encoded cell beacon.

12. The radio transceiver of claim 8, and wherein said transceiver is a trunking radio transceiver.

13. A method of receiving a signal from a cell of preference in a communications receiver wherein a first cell transmits a first signal comprising a cell beacon, and a second cell transmits a second signal, and wherein the communications receiver comprises a receiver for receiving the first and second signals, and a controller for enabling the receiver to receive either of the first or second signals, and the controller is operable to detect the cell beacon, and, wherein the communications receiver comprises a memory for storing an indicia of cell of preference that corresponds to the cell beacon, and further comprises a counter for counting the number of cell beacons received on the first signal, the method comprising the steps of:
while the receiver is enabled to receive the second signal, recalling the indicia of cell of preference;
enabling the receiver to receive the first signal for a first period of time;
counting the number of cell beacons received during said first period of time, and
upon accumulating a cell beacon count threshold by the counter within said first period of time, enabling the receiver to receive the first signal for longer than said first period of time.

14. The method of claim 13, further comprising the step of:
periodically recalling the indicia of cell of preference and enabling the receiver to receive the first signal for a first period of time.

15. The method of claim 13, and wherein the cell beacon comprises digitally encoded data.

16. A method of receiving a signal from a cell of preference in a communications receiver wherein a first cell transmits a first signal comprising a first cell ID code, and a second cell transmits a second signal, and wherein the communications receiver comprises a receiver for receiving the first and second signals, and a controller for enabling the receiver to receive either of the first or second signals, and the controller is operable to detect a first cell ID code, and, wherein the communications receiver comprises a memory having at least one storage location for storing a second cell ID code that corresponds to a cell of preference, and further comprises a counter for counting the number of first cell ID codes received on the first signal, the method comprising the steps of:
while the receiver is enabled to receive the second signal, recalling the second cell ID code;
enabling the receiver to receive the first signal for a first period of time;
detecting the second cell ID code during the first period of time;
comparing said first cell ID code to said second cell ID code and upon finding a correspondence therebetween;
counting the number of corresponding first and second cell ID codes received during said first period of time, and
upon accumulating a corresponding cell ID code count threshold by the counter within said first period of time, enabling the receiver to receive the first signal for longer than said first period of time.

17. The method of claim 16, and wherein the cell ID codes comprise digitally encoded data.

18. The method of claim 16, wherein the memory comprises a plurality of storage locations for storing a plurality of cell ID codes, and further comprising the steps of:
selecting said second cell ID code from said plurality of cell ID codes.

19. The method of claim 18 wherein said communications receiver comprises an actuator, coupled to said controller, for selecting said second cell ID code form the plurality of cell ID codes, by a user, and further comprising the step of:
selecting, by the user, the second cell ID code from the plurality of cell ID codes.

20. A method of communicating with a cell of preference in a multi-cell radio system wherein each cell comprises a first base transceiver for communicating with a radio transceiver, and each said first base transceiver transmits a radio signal having a cell beacon modulated thereon that identifies its cell, and, wherein the radio transceiver comprises a controller, coupled to a transceiver, for controlling the frequency of operation thereof, and a memory, coupled to the controller, having a plurality of storage locations for storing a plurality of preferred cell ID codes, and the controller is operable to decode cell beacons, and further comprises a counter for counting the number of cell beacons received on the signals, the method comprising the steps of:
monitoring a second cell for receiving a second radio signal;
recalling a preferred cell ID code;
enabling the radio transceiver to receive a first radio signal corresponding to said preferred cell ID code, for a first period of time;
upon receiving the first radio signal and decoding a first cell beacon that corresponds to said preferred cell ID code, during said first period of time;
continuing to receive additional cell beacons and counting the number of cell beacons received during said first period of time that correspond to said preferred cell ID code, and
upon accumulating a cell beacon count threshold by the counter within said first period of time, enabling the radio transceiver to continue to receive said first radio signal beyond said first period of time.

21. The method of claim 20 wherein said communications transceiver comprises an actuator, for actuation by a user, coupled to said controller, for selecting one of said plurality of preferred cell ID codes from said memory, and further comprising the step of:

selecting, by the user, one of said plurality of cell ID code from said memory.

22. The method of claim 20, further comprising the step of:

selecting one of said plurality of preferred cell ID codes based on a user selected call destination.

23. The method of claim 20, wherein at least one cell comprises a plurality of base transceivers operating as a trunking radio system.

24. The method of claim 20 wherein the cell beacon is modulated onto the radio signal as digital data.

25. The method of claim 24 wherein the cell beacon is modulated onto a sub-audible band of the radio signal.

26. The method of claim 24 wherein the cell beacon is modulated onto the radio signal transmitted by a plurality of said base transceiver all of which are within the trunking radio system.

27. The method of claim 24 wherein the cell beacon is modulated onto a radio signal transmitted by a single base transceiver in the trunking radio system.

* * * * *